United States Patent Office 2,811,521
Patented Oct. 29, 1957

2,811,521

PREPARATION OF Δ⁸-7,11-DIKETO-STEROIDS

John M. Chemerda, Metuchen, and Donald F. Reinhold, New Brunswick, N. J., assignors to Merck & Co., Inc., Rahway, N. J., a corporation of New Jersey No Drawing. Application January 23, 1953, Serial No. 333,015

21 Claims. (Cl. 260—239.55)

This invention is concerned generally with novel processes of preparing $\Delta^{8(9)}$-7,11-diketo-steroid compounds. More particularly, it relates to a novel process of preparing $\Delta^{8(9)}$-7,11-diketo-cyclopentanopolyhydrophenanthrene compounds starting with the corresponding $\Delta^{8(9)}$-11-keto-cyclopentanopolyhydrophenanthrene compound and to the intermediate compounds thus obtained. The resulting $\Delta^{8(9)}$-7,11-diketo-cyclopentanopolyhydrophenanthrene compounds are valuable in the preparation of the corresponding saturated 11-keto-cyclopentanopolyhydrophenanthrene compounds which, in turn, are valuable as intermediates for the preparation of steroid hormones having an oxygen atom attached to the C–11 carbon atom such as the adrenal hormones corticosterone, cortisone and Compound F.

The $\Delta^{8(9)}$-7,11-diketo-cyclopentanopolyhydrophenanthrene compounds, produced in accordance with our novel procedure, have at rings B and C the following chemical structure:

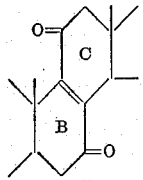

In accordance with the novel process, subject of the present invention, a $\Delta^{8(9)}$-11-keto-cyclopentanopolyhydrophenanthrene compound (Compound 1 hereinbelow) is reacted with an acylating agent to produce the corresponding $\Delta^{7,9(11)}$-11-acyloxy-cyclopentanopolyhydrophenanthrene compound (Compound 2); this compound is reacted with N-bromosuccinimide to form the corresponding $\Delta^{8(9)}$-7-bromo-11-keto-cyclopentanopolyhydrophenanthrene compound (Compound 3) which, in turn, is reacted with silver nitrate and chromium trioxide thereby forming the corresponding $\Delta^{8(9)}$-7,11-diketo-cyclopentanopolyhydrophenanthrene compound (Compound 4). Alternatively, a $\Delta^{8(9)}$-7-keto-11-bromo-cyclopentanopolyhydrophenanthrene compound (Compound 5) can be reacted with silver nitrate and chromium trioxide to produce the corresponding $\Delta^{8(9)}$-7,11-diketo-cyclopentanopolyhydrophenanthrene compound (Compound 4).

The reactions indicated hereinabove may be chemically represented, insofar as rings B and C are concerned, as follows:

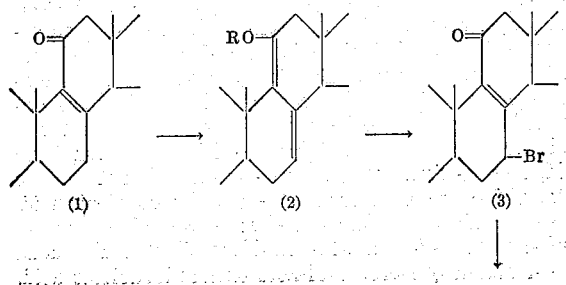

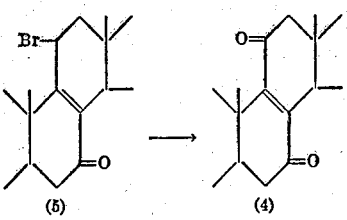

wherein R is an acyl radical.

The $\Delta^{8(9)}$-11-keto-cyclopentanopolyhydrophenanthrene compounds utilized as starting material in our novel procedure can be prepared starting, in turn, with the corresponding $\Delta^{7,9(11)}$-cyclopentanopolyhydrophenanthrene compounds, certain of which, such as ergosterol-D and 3-acyloxy derivatives thereof are described in the prior art. Other $\Delta^{7,9(11)}$-cyclopentanopolyhydrophenanthrene compounds can be prepared, starting with the readily available $\Delta^5$-cyclopentanopolyhydrophenanthrene compounds such as cholesterol, by treating said $\Delta^5$-cyclopentanopolyhydrophenanthrene compound (Compound 6 hereinbelow) with N-bomosuccinimide, reacting the resulting $\Delta^5$-7-bromo-cyclopentanopolyhydrophenanthrene compound (Compound 7) with a tertiary amine to form the corresponding $\Delta^{5,7}$-cyclopentanopolyhydrophenanthrene compound (Compound 8); reacting this compound with hydrogen in the presence of Raney nickel catalyst thereby selectively reducing the unsaturated ring attached to the carbon atom in the 5-position to form the corresponding $\Delta^7$-cyclopentanopolyhydrophenanthrene compound (Compound 9) and bring said $\Delta^7$-cyclopentanopolyhydrophenanthrene compound into intimate contact with a solution of mercuric acetate in acetic acid thereby producing the corresponding $\Delta^{7,9(11)}$-cyclopentanopolyhydrophenanthrene compound (Compound 10). The reactions indicated hereinabove may be chemically represented (insofar as rings B and C are concerned) as follows:

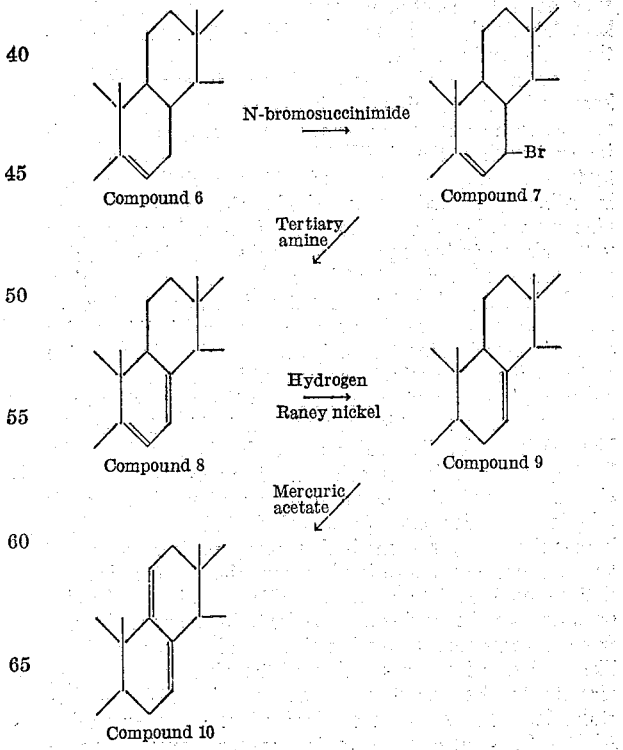

The $\Delta^{7,9(11)}$-cyclopentanopolyhydrophenanthrene compound is reacted with perbenzoic acid thereby forming the corresponding epoxide of the $\Delta^{7,9(11)}$-cyclopentanopolyhydrophenanthrene compound (Compound 11)

which, in turn, is reacted with boron trifluoride in ether under substantially anhydrous conditions to produce the corresponding $\Delta^{8(9)}$-11-keto-cyclopentanopolyhydrophenanthrene compound (Compound 1). These reactions may be chemically represented, with respect to the changes occurring in rings B and C, as follows:

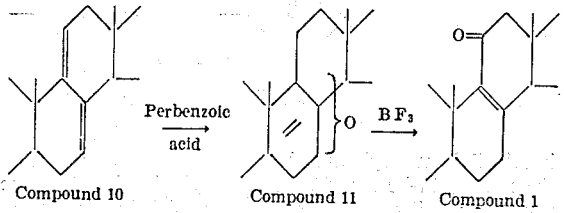

Compound 10    Compound 11    Compound 1

The reactions indicated hereinabove are described in detail in a co-pending application of applicants' assignee, Serial No. 263,473, filed December 26, 1951.

The $\Delta^{8(9)}$-11-keto-cyclopentanopolyhydrophenanthrene compounds which we ordinarily employ as starting materials in carrying out our process are those having a sterol side chain attached to the carbon atom in the 17-position of the molecule such as $\Delta^{8(9),22}$-11-keto-ergostadiene, $\Delta^{8(9),22}$-3-acyloxy-11-keto-ergostadiene, $\Delta^{8(9),22}$-3-acetoxy-11-keto-ergostadiene, $\Delta^{8(9),22}$-3-hydroxy-11-keto-ergostadiene, $\Delta^{8(9)}$-11-keto-cholestene, $\Delta^{8(9)}$-3-acyloxy-11-keto-cholestene, $\Delta^{8(9)}$-3-acetoxy-11-keto-cholestene, $\Delta^{8(9)}$-3-hydroxy-11-keto-cholestene, $\Delta^{8(9),22}$-3-hydroxy-11-keto-stigmastadiene, $\Delta^{8(9),22}$-3-acyloxy-11-keto-stigmastadiene, $\Delta^{8(9),22}$-3-acetoxy-11-keto-stigmastadiene, a bile acid side chain attached to the 17-carbon atom such as $\Delta^{8(9)}$-3-hydroxy-11-keto-cholenic acid, $\Delta^{8(9)}$-3-acyloxy-11-keto-cholenic acid, $\Delta^{8(9)}$-3-acetoxy-11-keto-cholenic acid, a degraded bile acid side chain attached to the 17-carbon atom such as $\Delta^{8(9)}$-3-hydroxy-11-keto-bisnorallocholenic acid, $\Delta^{8(9)}$-3-acyloxy-11-keto-bisnorallocholenic acid, $\Delta^{8(9)}$-3-acetoxy-11-keto-bisnorallocholenic acid, a 17-acetyl substituent such as $\Delta^{8(9)}$-3-acyloxy-11,20-diketoallopregnene, $\Delta^{8(9)}$-3-acetoxy-11,20-diketo-allopregnene, $\Delta^{8(9)}$-3-hydroxy-11,20-diketo-allopregnene, a sapogenin side chain such as $\Delta^{8(9)}$-11-keto-dehydrotigogenin acylate, $\Delta^{8(9)}$-11-keto-dehydrotigogenin acetate, $\Delta^{8(9)}$-11-keto-dehydrotigogenin, and the like.

In accordance with our novel procedure, the $\Delta^{8(9)}$-11-keto-cyclopentanopolyhydrophenanthrene compound is reacted with an acylating agent to produce the corresponding enol acylate, the $\Delta^{7,9(11)}$-11-acyloxy-cyclopentanopolyhydrophenanthrene compound. This acylation reaction is ordinarily carried out by bringing the $\Delta^{8(9)}$-11-keto-cyclopentanopolyhydrophenanthrene into intimate contact with said acylating agent, preferably benzoic anhydride or a lower alkanoic anhydride such as acetic anhydride, propionic anhydride, butyric anhydride, and the like, in the presence of a catalyst such as an acyl halide as for example acetyl chloride, p-toluene sulfonic acid, pyridine and the like. If desired, we can utilize, as the acylating agent, an isopropenyl acylate such as isopropenyl acetate, a lower alkanoyl halide such as acetyl chloride, and the like. We ordinarily prefer to conduct the reaction by heating a suspension or solution of the $\Delta^{8(9)}$-11-keto-cyclopentanopolyhydrophenanthrene compound in the acylating agent under reflux for a period of about one to four hours; the excess reagent is then removed from the reaction mixture by evaporation in vacuo, thereby forming the desired enol acylate as a crystallizable oil. This oily product may be purified, if desired, by recrystallization from solvents such as methanol, ethanol, acetone and the like. Alternatively, a solution of the oil may be treated directly in the succeeding reaction with N-bromosuccinimide. There is thus obtained the corresponding $\Delta^{7,(9)}$-11-acyloxy-cyclopentanopolyhydrophenanthrene compound such as $\Delta^{7,9(11),22}$-11-acyloxy-ergostatriene, $\Delta^{7,9(11),22}$-3,11-diacyloxy-ergostatriene, $\Delta^{7,9(11),22}$-3,11-dialkanoxy-ergostatriene, $\Delta^{7,9(11),22}$-3,11-diacetoxy-ergostatriene, $\Delta^{7,9(11),22}$-3,11-dibenzoxy-ergostatriene, $\Delta^{7,9(11)}$-11-acyloxycholestadiene, $\Delta^{7,9(11)}$-3,11-diacyloxy-cholestadiene, $\Delta^{7,9(11)}$-3,11-dialkanoxy-cholestadiene, $\Delta^{7,9(11)}$-3,11-diacetoxy-cholestadiene, $\Delta^{7,9(11)}$-3,11-dibenzoxy-cholestadiene, $\Delta^{7,9(11),22}$-3,11-diacyloxy-stigmastatriene, $\Delta^{7,9(11),22}$-3,11-dialkanoxy-stigmastatriene, $\Delta^{7,9(11),22}$-3,11-diacetoxy-stigmastatriene, $\Delta^{7,9(11),22}$-3,11-dibenzoxy-stigmastatriene, $\Delta^{7,9(11)}$-3,11-diacyloxy-choladienic acid, $\Delta^{7,9(11)}$-3,11-dialkanoxy-choladienic acid, $\Delta^{7,9(11)}$-3,11-diacetoxy-choladienic acid, $\Delta^{7,9(11)}$-3,11-dibenzoxy-choladienic acid, $\Delta^{7,9(11)}$-3,11-diacyloxy-allocholadienic acid, $\Delta^{7,9(11)}$-3,11-diacetoxy-allocholadienic acid, $\Delta^{7,9(11)}$-3,11-dibenzoxy-allocholadienic acid, $\Delta^{7,9(11)}$-3,11-diacyloxy-bisnorcholadienic acid, $\Delta^{7,9(11)}$-3,11-dialkanoxy-bisnorcholadienic acid, $\Delta^{7,9(11)}$-3,11-diacetoxy-bisnorcholadienic acid, $\Delta^{7,9(11)}$-3,11-dibenzoxy-bisnorcholadienic acid, $\Delta^{7,9(11)}$-3,11-diacyloxy-bisnorallocholadienic acid, $\Delta^{7,9(11)}$-3,11-dialkanoxy-bisnorallocholadienic acid, $\Delta^{7,9(11)}$-3,11-diacetoxy-bisnorallocholadienic acid, $\Delta^{7,9(11)}$-3,11-dibenzoxy-bisnorallocholadienic acid, $\Delta^{7,9(11)}$-3,11-diacyloxy-etiocholadienic acid, $\Delta^{7,9(11)}$-3,11-diacyloxy-etioallocholadienic acid, $\Delta^{7,9(11)}$-3,-11-diacyloxy-20-keto-pregnadiene, $\Delta^{7,9(11)}$-3,11-dialkanoxy-20-keto-pregnadiene, $\Delta^{7,9(11)}$-3,11-diacetoxy-20-keto-pregnadiene, $\Delta^{7,9(11)}$-3,11-dibenzoxy-20-keto-pregnadiene, $\Delta^{7,9(11)}$-3,11-diacyloxy-20-keto-allopregnadiene, $\Delta^{7,9(11)}$-3,11-dialkanoxy-20-keto-allopregnadiene, $\Delta^{7,9(11)}$-3,11-diacetoxy-20-keto-allopregnadiene, $\Delta^{7,9(11)}$-3,11-dibenzoxy-20-keto-allopregnadiene, $\Delta^{7,9(11)}$-11-acyloxy-bisdehydrotigogenin acylate, $\Delta^{7,9(11)}$-11-alkanoxy-bisdehydrotigogenin alkanoate, $\Delta^{7,9(11)}$-11-benzoxy-bisdehydrotigogenin benzoate, $\Delta^{7,9(11)}$-11-acetoxy-bisdehydrotigogenin acetate, and the like.

The $\Delta^{7,9(11)}$-11-acyloxy-cyclopentanopolyhydrophenanthrene compound is then reacted with N-bromosuccinimide, thereby replacing the hydrogen atom attached to the carbon atom in the 7-position by a bromo radical. The reaction between the $\Delta^{7,9(11)}$-11-acyloxy-cyclopentanopolyhydrophenanthrene compound and the N-bromosuccinimide is preferably carried out by bringing the reactants together in an aqueous organic solvent such as aqueous acetone, or aqueous alcohol. The reaction between the $\Delta^{7,9(11)}$-11-acyloxy-cyclopentanopolyhydrophenanthrene compound and the N-bromosuccinimide is allowed to proceed at a low temperature, preferably within the range of about 0–10° C. for a period of about thirty minutes. The 7-bromo ketone thus formed, being insoluble in the reaction mixture, is readily isolated by filtration or centrifugation and may be purified, if desired, by recrystallization from a solvent such as methanol, ethanol, acetone, and the like. There is thus obtained the corresponding $\Delta^{8(9)}$-7-bromo-11-keto-cyclopentanopolyhydrophenanthrene compound such as $\Delta^{8(9),22}$-7-bromo-11-keto-ergostadiene, $\Delta^{8(9),22}$-3-acyloxy-7-bromo-11-keto-ergostadiene, $\Delta^{8(9),22}$-3-alkanoxy-7-bromo-11-keto-ergostadiene, $\Delta^{8(9),22}$-3-acetoxy-7-bromo-11-keto-ergostadiene, $\Delta^{8(9),22}$-3-benzoxy-7-bromo-11-keto-ergostadiene, $\Delta^{8(9)}$-7-bromo-11-keto-cholestene, $\Delta^{8(9)}$-3-acyloxy-7-bromo-11-keto-cholestene, $\Delta^{8(9)}$-3-alkanoxy-7-bromo-11-keto-cholestene, $\Delta^{8(9)}$-3-acetoxy-7-bromo-11-keto-cholestene, $\Delta^{8(9)}$-3-benzoxy-7-bromo-11-keto-cholestene, $\Delta^{8(9),22}$-3-acyloxy-7-bromo-11-keto-stigmastadiene, $\Delta^{8(9),22}$-3-alkanoxy-7-bromo-11-keto-stigmastadiene, $\Delta^{8(9),22}$-3-acetoxy-7-bromo-11-keto-stigmastadiene, $\Delta^{8(9),22}$-3-benzoxy-7-bromo-11-keto-stigmastadiene, $\Delta^{8(9)}$-3-acyloxy-7-bromo-11-keto-cholenic acid, $\Delta^{8(9)}$-3-alkanoxy-7-bromo-11-keto-cholenic acid, $\Delta^{8(9)}$-3-acetoxy-7-bromo-11-keto-cholenic acid, $\Delta^{8(9)}$-3-benzoxy-7-bromo-11-keto-cholenic acid, $\Delta^{8(9)}$-3-acyloxy-7-bromo-11-keto-allocholenic acid, $\Delta^{8(9)}$-3-acetoxy-7-bromo-11-keto-allocholenic acid, $\Delta^{8(9)}$-3-benzoxy-7-bromo-11-keto-allocholenic acid, $\Delta^{8(9)}$-3-acyloxy-7-bromo-11-keto-bisnorcholenic acid, $\Delta^{8(9)}$-3-alkanoxy-7-bromo-11-keto-bisnorcholenic acid, $\Delta^{8(9)}$-3-acetoxy-7-bromo-11-keto-bisnorcholenic acid, $\Delta^{8(9)}$-3-benzoxy-7-bromo-11-keto-bisnorcholenic acid, $\Delta^{8(9)}$-3-acyloxy-7-bromo-11-keto-bisnorallocholenic acid, $\Delta^{8(9)}$-3-alkanoxy-7-bromo-11-keto-bisnorallocholenic acid, $\Delta^{8(9)}$-3-acetoxy-7-bromo-11-keto-bisnorallocholenic acid, $\Delta^{8(9)}$-3-benzoxy-7-bromo-11-keto-bisnorallocholenic acid, $\Delta^{8(9)}$-3-acyloxy-7-bromo-11-keto-etiocholenic acid, $\Delta^{8(9)}$-3-acyloxy-7-bromo-11-keto-etioallocholenic acid, $\Delta^{8(9)}$-3-acyloxy-7-bromo-11,20-diketo-pregnene, $\Delta^{8(9)}$-3-alkanoxy-7-bromo-11,20-diketo-pregnene, $\Delta^{8(9)}$-3-acetoxy-7-bromo-11,20-diketo-pregnene, $\Delta^{8(9)}$-3-benzoxy-7-bromo-11,20-diketo-pregnene, $\Delta^{8(9)}$-3-acyloxy-7-bromo-11,20-diketo-allopregnene, $\Delta^{8(9)}$-3-alkanoxy-7-bromo-11,20-diketo-allopregnene, $\Delta^{8(9)}$-3-acetoxy-7-bromo-11,20-diketo-allopregnene, $\Delta^{8(9)}$-3-benzoxy-7-bromo-11,20-diketo-allopregnene, $\Delta^{8(9)}$-7-bromo-11-keto-dehydrotigogenin acylate, $\Delta^{8(9)}$-7-bromo-11-keto-dehydrotigogenin alkanoate, $\Delta^{8(9)}$-7-bromo-11-keto-dehydrotigogenin benzoate, $\Delta^{8(9)}$-7-bromo-11-keto-dehydrotigogenin acetate, and the like.

The $\Delta^{8(9)}$-7-bromo-11-keto-cyclopentanopolyhydrophenanthrene compound, or if desired, the corresponding $\Delta^{8(9)}$-7-keto-11-bromo-cyclopentanopolyhydrophenanthrene compound is reacted, in a medium comprising an aqueous organic solvent, with silver chromate and excess chromium trioxide, thereby forming the corresponding $\Delta^{8(9)}$-7,11-diketo-cyclopentanopolyhydrophenanthrene compound.

Where it is desired to utilize a $\Delta^{8(9)}$-7-keto-11-bromo-cyclopentanopolyhydrophenanthrene compound in our procedure, the latter can be prepared in accordance with the procedures disclosed in a co-pending application of applicants' assignee, Serial No. 240,281, filed August 3, 1951.

The reaction between the $\Delta^{8(9)}$-7-bromo-11-keto-cyclopentanopolyhydrophenanthrene compound (or $\Delta^{8(9)}$-7-keto-11-bromo-cyclopentanopolyhydrophenanthrene compound) silver chromate and excess chromium trioxide is ordinarily conducted as follows: an aqueous solution of silver nitrate and an aqueous solution containing an excess of chromium trioxide are added simultaneously to a solution of the bromo-ketone in an organic solvent, as for example, a lower alkanol such as ethanol, methanol, propanol, butanol, a lower dialkyl ketone such as acetone, a mixture of a dialkyl ketone and an alkanol, and the like; we ordinarily prefer to utilize tertiary butanol as the organic solvent. The silver nitrate and chromium trioxide react immediately to form silver chromate in the reaction medium which, in turn, reacts with the $\Delta^{8(9)}$-7-bromo-11-keto-cyclopentanopolyhydrophenanthrene compound (or $\Delta^{8(9)}$-7-keto-11-bromo-cyclopentanopolyhydrophenanthrene compound) thereby eliminating the 7-bromo (or 11-bromo) radical from the steroid nucleus, whereupon the intermediate product thus formed is oxidized by the excess chromium trioxide present in the reaction mixture to produce the corresponding $\Delta^{8(9)}$-7,11-diketo-cyclopentanopolyhydrophenanthrene compound. We ordinarily carry out this dehalogenation and oxidation reaction at substantially about room temperature under which conditions the reaction is usually substantially complete in approximately four to five hours, although longer reaction times may be utilized, if desired. The $\Delta^{8(9)}$-7,11-diketo-cyclopentanopolyhydrophenanthrene compound is conveniently recovered from the reaction mixture by extraction with a water-immiscible solvent such as ether followed by evaporation of the ethereal extract. The crude residual product thus obtained can be purified by conventional procedures, as for example, by chromatography utilizing acid-washed alumina, elution with a hydrocarbon solvent such as benzene and recrystallization of the eluted material from a lower alkanol such as methanol. The $\Delta^{8(9)}$-7,11-diketo-cyclopentanopolyhydrophenanthrene compounds, obtained in accordance with our novel procedure, include $\Delta^{8(9),22}$-7,11-diketo-ergostadiene, $\Delta^{8(9),22}$-3-acyloxy-7,11-diketo-ergostadiene, $\Delta^{8(9),22}$-3-benzoxy-7,11-diketo-ergostadiene, $\Delta^{8(9)}$-7,11-diketo-cholestene, $\Delta^{8(9)}$-3-acyloxy-7,11-diketo-cholestene, $\Delta^{8(9)}$-3-acetoxy-7,11-diketo-cholestene, $\Delta^{8(9)}$-3-benzoxy-7,11-diketo-cholestene, $\Delta^{8(9),22}$-3-benzoxy-7,11-diketo-stigmastadiene, $\Delta^{8(9),22}$-3-acyloxy-7,11-diketo-stigmastadiene, $\Delta^{8(9),22}$-3-acetoxy-7,11-diketo-stigmastadiene, $\Delta^{8(9)}$-3-benzoxy-7,11-diketo-cholenic acid, $\Delta^{8(9)}$-3-acyloxy-7,11-diketo-cholenic acid, $\Delta^{8(9)}$-3-acetoxy-7,11-diketo-cholenic acid, $\Delta^{8(9)}$-3-benzoxy-7,11-diketo-bisnorallocholenic acid, $\Delta^{8(9)}$-3-acyloxy-7,11-diketo-bisnorallocholenic acid, $\Delta^{8(9)}$-3-acetoxy-7,11-diketo-bisnorallocholenic acid, $\Delta^{8(9)}$-3-acyloxy-7,11,20-triketo-allopregnene, $\Delta^{8(9)}$-3-acetoxy-7,11,20-triketo-allopregnene, $\Delta^{8(9)}$-3-benzoxy-7,11,20-triketo-allopregnene, $\Delta^{8(9)}$-7,11-diketo-dehydrotigogenin acylate, $\Delta^{8(9)}$-7,11-diketo-dehydrotigogenin acetate, $\Delta^{8(9)}$-7,11-diketo-dehydrotigogenin benzoate, and the like.

The following examples illustrate methods of carrying out the present invention, but it is to be understood that these examples are given for purposes of illustration and not of limitation.

*Example 1*

A mixture of 2.275 g. of $\Delta^{8(9),22}$-3-acetoxy-11-keto-ergostadiene, 10 ml. of isopropenyl acetate and 190 mg. of p-toluene sulfonic acid was heated under reflux for a period of about four hours. The unreacted isopropenyl acetate was evaporated from the reaction mixture under reduced pressure, and the residual material was dissolved in ether. The ethereal solution was washed with a cold 1% aqueous solution of sodium bicarbonate and then with ice water. The washed ethereal solution was dried over magnesium sulfate and the ether was evaporated from the dry ethereal solution under reduced pressure to give a dark yellow oil which crystallized on standing. The latter material was recrystallized three times from methanol to give substantially pure $\Delta^{7,9(11),22}$-3,11-diacetoxy-ergostatriene; M. P. 109.6–110.4° C.; U. V. $\lambda$ max.=2400; E%=278 (ethanol). Anal. Calc'd for $C_{32}H_{48}O_4$: C, 77.42; H, 9.75. Found: C, 77.24; H, 9.77. $[\alpha]_D^{23\,°\,C.}=+41°$ (chloroform).

*Example 2*

A mixture of 500 mg. of $\Delta^{8(9),22}$-3-acetoxy-11-keto-ergostadiene in 10 ml. of acetyl chloride was heated under reflux for a period of about eighty minutes. The unreacted acetyl chloride was evaporated from the reaction mixture under reduced pressure to give $\Delta^{7,9(11),22}$-3,11-diacetoxy-ergostatriene which was obtained in the form of a viscous oil. The $\Delta^{7,9(11),22}$-3,11-diacetoxy-ergostatriene was dissolved in 20 ml. of acetone; 3.25 ml. of water was added followed by 186 mg. of N-bromsuccinimide. The mixture was allowed to stand for a period of about five minutes whereupon a copious white precipitate formed; the mixture was cooled to a temperature of about 0° C. and maintained at that temperature for a period of about thirty minutes. The precipitated material was recovered by filtration and recrystallized from methanol-acetone to give substantially pure $\Delta^{8(9),22}$-3-acetoxy-7-bromo-11-keto-ergostadiene which was obtained in the form of fine silky needles; M. P. 160–161° C. dec.; U. V.=$\lambda$ max. 2630; E%=195; $[\alpha]_D^{24\,°\,C.}=+67°$ (chloroform). Anal. Calc'd for $C_{30}H_{45}O_3Br$: C, 67.54; H, 8.50; Br, 14.98. Found: C, 67.53; H, 8.40; Br, 15.00.

*Example 3*

To a solution containing 533 mg. of $\Delta^{8(9),22}$-3-acetoxy-7-bromo-11-keto-ergostadiene in 50 ml. of t-butanol was added a solution containing 300 mg. of silver nitrate in 3 ml. of water and, simultaneously, a solution containing 900 mg. of chromium trioxide in 5 ml. of water. A precipitate of silver chromate formed immediately, and the mixture was stirred at about room temperature for a period of approximately four hours. The reaction mixture was poured into water, and the aqueous mixture was extracted with 200 ml. of ether. The ethereal extract was washed first with three portions of water, then with a saturated aqueous solution of sodium bicarbonate, and then with a saturated aqueous solution of sodium chloride. The washed ethereal extract was dried over sodium sulfate, and the ether and t-butanol were evaporated from the dry ethereal solution in vacuo. The yellow residual material thus obtained was dissolved in a 1:1 mixture of benzene in petroleum ether, and chromatographed on 17 g. of acid-washed alumina. The column was developed with the following solvent mixtures taken in order:

(1) One part petroleum ether to one part benzene
(2) One part petroleum ether to four parts benzene
(3) Benzene
(4) Four parts benzene to one part diethyl ether
(5) Three parts benzene to two parts diethyl ether
(6) One part benzene to four parts diethyl ether
(7) Diethyl ether
(8) Chloroform
(9) Methanol A yellow crystalline substance was obtained upon evaporation of the following eluates: one part petroleum ether to four parts benzene; one part diethyl ether to four parts benzene. These fractions were combined and recrystallized from ethanol to give substantially pure $\Delta^{8(9),22}$-3-acetoxy-7,11-diketo-ergostadiene which was obtained in the form of faint yellow needle-like crystals; M. P. 133–137° C.; U. V. λ max.=2690; E%=175.

*Example 4*

A mixture of 2 g. of $\Delta^{8(9),22}$-3-hydroxy-7-keto-ergostadiene and 20 ml. of acetic anhydride was heated under reflux for a period of about thirty minutes. The solution was cooled, 10 ml. of acetyl chloride was added thereto, and the resulting mixture was heated under reflux for a period of about one hour. The solvents were evaporated from the reaction mixture under reduced pressure to give $\Delta^{7,9(11),22}$-3,7-diacetoxy-ergostatriene which is obtained in the form of a viscous oil.

The $\Delta^{7,9(11),22}$-3,7-diacetoxy-ergostatriene was dissolved in 90 ml. of acetone, to the solution was added 15 ml. of water followed by 783 mg. of N-bromsuccinimide. A white crystalline material immediately precipitated and the resulting slurry was cooled to about 0° C. and maintained at that temperature for a period of approximately forty minutes. The precipitated material was recovered by filtration, recrystallized from acetone-chloroform to give substantially pure $\Delta^{8(9),22}$-3-acetoxy-11-bromo-7-keto-ergostadiene; M. P. 150–151° C. dec. with darkening at 125° C.; [α]$_D^{24.5°}$ C. +219° (dioxane); U. V. λ max.= 2670; E%=147 (ether). Anal. Calc'd for $C_{30}H_{45}O_3Br$; C, 67.54; H, 8.50. Found: C, 67.76; H, 8.49.

*Example 5*

Three hundred milligrams of $\Delta^{8(9),22}$-3-acetoxy-11-bromo-7-keto-ergostadiene were dissolved in a mixture of 65 ml. of t-butanol and 15 ml. of acetone. To this solution were added, simultaneously and with rapid agitation, a solution containing 180 mg. of silver nitrate in a small amount of distilled water and a solution containing 700 mg. of chromium trioxide in a small amount of distilled water. The orange-colored heterogeneous mixture was stirred for a period of about five hours at about room temperature, and the reaction mixture was then poured into water. The aqueous mixture was extracted with two 100 ml. portions of ether. The ethereal solution was washed first with three 100 ml. portions of water, then with a saturated aqueous sodium bicarbonate solution and finally with a saturated aqueous solution of sodium chloride. The washed ethereal solution was dried over magnesium sulfate, and the ether was evaporated from the dried ethereal solution by distillation under reduced pressure to give $\Delta^{8(9),22}$-3-acetoxy-7,11-diketo-ergostadiene which was obtained in the form of a dark-colored oil. This material was purified by chromatography on acid-washed alumina. The chromatograph was eluted with benzene, the benzene eluate was evaporated to dryness, and the residual material was recrystallized twice from methanol to give substantially pure $\Delta^{8(9),22}$-3-acetoxy-7,11-diketo-ergostadiene; M. P. 136–137° C.; λ max.= 2690; E%=170.

Various changes and modifications may be made in carrying out the present invention without departing from the spirit and scope of the present invention. Insofar as these changes and modifications are within the purview of the annexed claims, they are to be considered as part of our invention.

We claim:

1. The process which comprises reacting $\Delta^{8(9),22}$-3-acetoxy-11-keto-ergostadiene with an acetylating agent to produce $\Delta^{7,9(11),22}$-3,11-diacetoxy-ergostatriene, reacting the latter compound with N-bromsuccinimide thereby forming $\Delta^{8(9),22}$-3-acetoxy-7-bromo-11-keto-ergostadiene, and reacting said $\Delta^{8(9),22}$-3-acetoxy-7-bromo-11-keto-ergostadiene with silver nitrate and chromium trioxide to produce $\Delta^{8(9),22}$-3-acetoxy-7,11-diketo-ergostadiene.

2. The process which comprises reacting $\Delta^{8(9),22}$-11-keto-dehydrotigogenin acetate with an acetylating agent thereby forming $\Delta^{7(9),11}$-11-acetoxy-bis-dehydrotigogenin acetate, reacting the latter compound with N-bromsuccinimide to produce $\Delta^{8(9)}$-7-bromo-11-keto-dehydrotigogenin acetate and reacting said $\Delta^{8(9)}$-7-bromo-11-keto-dehydrotigogenin acetate with silver nitrate and chromium trioxide to produce $\Delta^{8(9)}$-7,11-diketo-dehydrotigogenin acetate.

3. The process which comprises reacting $\Delta^{8(9),22}$-3-hydroxy-11-keto-ergostadiene with an acetylating agent to produce $\Delta^{7,9(11),22}$-3,11-diacetoxy-ergostatriene.

4. The process which comprises reacting a $\Delta^{8(9)}$-11-keto-dehydrotigogenin compound with an acetylating agent to produce the corresponding $\Delta^{7,9(11)}$-11-acyloxy-bis-dehydrotigogenin.

5. The process which comprises reacting $\Delta^{8(9)}$-11-keto-dehydrotigogenin acetate with an acetylating agent thereby forming $\Delta^{7,9(11)}$-11-acetoxy-bis-dehydrotigogenin acetate.

6. The process which comprises reacting a $\Delta^{7,9(11),22}$-11-acyloxy-ergostatriene compound with N-bromsuccinimide to produce the corresponding $\Delta^{8(9),22}$-7-bromo-11-keto-ergostadiene compound.

7. The process which comprises reacting $\Delta^{7,9(11),22}$-3,11-diacetoxy-ergostatriene with N-bromsuccinimide to produce $\Delta^{8(9),22}$-3-acetoxy-7-bromo-11-keto-ergostadiene.

8. The process which comprises reacting a $\Delta^{7,9(11)}$-11-acyloxy-bis-dehydrotigogenin compound with N-bromsuccinimide to form the corresponding $\Delta^{8(9)}$-7-bromo-11-keto-dehydrotigogenin compound.

9. The process which comprises reacting $\Delta^{7,9(11)}$-bis-dehydrotigogenin acetate with N-bromsuccinimide to produce $\Delta^{8(9)}$-7-bromo-11-keto-dehydrotigogenin acetate.

10. The process which comprises reacting a $\Delta^{8(9),22}$-7-bromo-11-keto-ergostadiene compound with silver chromate and chromium trioxide to produce the corresponding $\Delta^{8(9)}$-7,11-diketo-cyclopentanopolyhydrophenanthrene compound.

11. The process which comprises reacting a $\Delta^{8(9),22}$-7-keto-11-bromo-ergostadiene compound with silver chromate and chromium trioxide to produce the corresponding $\Delta^{8(9)}$-7,11-diketo-cyclopentanopolyhydrophenanthrene compound.

12. The process which comprises reacting $\Delta^{8(9),22}$-3-acetoxy-7-bromo-11-keto-ergostadiene with silver chromate and chromium trioxide to produce $\Delta^{8(9),22}$-3-acetoxy-7,11-diketo-ergostadiene.

13. The process which comprises reacting $\Delta^{8(9),22}$-3-acetoxy-7-keto-11-bromo-ergostadiene with silver chromate and chromium trioxide to produce $\Delta^{8(9),22}$-3-acetoxy-7,11-diketo-ergostadiene.

14. The process which comprises reacting a $\Delta^{8(9)}$-7-bromo-11-keto-dehydrotigogenin compound with silver chromate and chromium trioxide to produce the corresponding $\Delta^{8(9)}$-7,11-diketo-dehydrotigogenin compound.

15. The process which comprises reacting a $\Delta^{8(9)}$-7-keto-11-bromo-dehydrotigogenin compound with silver chromate and chromium trioxide to produce the corresponding $\Delta^{8(9)}$ - 7,11-diketo-dehydrotigogenin compound.

16. $\Delta^{7,9(11),22}$-3,11-diacetoxy-ergostatriene.
17. $\Delta^{7,9(11)}$-11-acetoxy-bis-dehydrotigogenin acetate.
18. $\Delta^{8(9),22}$-7-bromo-11-keto-ergostadiene compounds.
19. $\Delta^{8(9),22}$-3-acetoxy-7-bromo-11-keto-ergostadiene.
20. $\Delta^{8(9)}$-7 - bromo - 11 - keto - dehydrotigogenin compounds.
21. $\Delta^{8(9)}$ - 7-bromo-11-keto-dehydrotigogenin acetate.

References Cited in the file of this patent

UNITED STATES PATENTS 2,602,769   Murray _____ July 8, 1952